United States Patent [19]

Visca et al.

[11] Patent Number: 4,798,854

[45] Date of Patent: Jan. 17, 1989

[54] PROCESS FOR THE PRODUCTION OF A COMPOSITE MATERIAL BASED ON A POLYMER MATRIX

[75] Inventors: Mario Visca, Alessandria; Giancarlo Boero, Asti; Daria Lenti, Alessandria, all of Italy

[73] Assignee: Ausimont S.p.A., Milan, Italy

[21] Appl. No.: 19,255

[22] Filed: Feb. 26, 1987

[30] Foreign Application Priority Data

| Apr. 5, 1985 | [IT] | Italy | 20262 A/85 |
| Apr. 4, 1986 | [AU] | Australia | 55676/86 |
| Apr. 4, 1986 | [CA] | Canada | 505873 |
| Apr. 4, 1986 | [EP] | European Pat. Off. | 86302517 |
| Apr. 4, 1986 | [JP] | Japan | 76847 |
| Apr. 4, 1986 | [ES] | Spain | 554180 |
| Aug. 7, 1986 | [JP] | Japan | 51-184361 |

[51] Int. Cl.$^4$ .................. C08J 3/20; C08J 5/02; C08K 7/02; C08L 27/12
[52] U.S. Cl. .................. 523/334; 523/335; 524/546
[58] Field of Search .............. 523/334, 335, 343; 524/546

[56] References Cited

U.S. PATENT DOCUMENTS

| 3,551,370 | 12/1970 | Dalton | 523/335 |
| 3,886,108 | 5/1975 | Snow | 523/335 |
| 3,892,700 | 7/1975 | Burke | 523/335 |
| 4,084,033 | 4/1978 | Drelich | 428/198 |
| 4,110,240 | 8/1978 | Leo et al. | 523/335 |
| 4,177,180 | 12/1979 | Hall | 523/334 |
| 4,282,059 | 8/1981 | Davidson | 162/158 |
| 4,426,470 | 1/1984 | Wessling et al. | 523/334 |
| 4,525,519 | 6/1985 | Leising | 524/828 |
| 4,528,322 | 7/1985 | Leising | 524/829 |
| 4,554,061 | 11/1985 | Ritchie | 523/402 |

*Primary Examiner*—Herbert J. Lilling
*Attorney, Agent, or Firm*—Stevens, Davis, Miller & Mosher

[57] ABSTRACT

Process for the production of a composite material based on a polymer matrix comprising homogeneously dispersed therein an organic and/or inorganic filler, said process consisting in mixing together the aqueous dispersions of the single components, in which the dispersed particles of the dispersion have a surface charge of the same sign and a "zeta potential" between 10 and 100mV (in absolute value) and wherein the ratio (in absolute value) between the "zeta potentials" of the particles of each dispersion is between 0.2 and 5.

29 Claims, No Drawings

PROCESS FOR THE PRODUCTION OF A COMPOSITE MATERIAL BASED ON A POLYMER MATRIX

RELATED APPLICATION

This is a continuation-in-part of application Ser. No. 848,278, filed Apr. 4, 1986, now abandoned.

THE DISCLOSURE

1. Field of the Invention

The present invention relates to a process for the production of a composite material based on a polymeric matrix. More particularly, the present invention relates to a process for the preparation of a composite material based on a polymer matrix comprising, homogeneously dispersed therein, an organic and/or inorganic filler.

2. The Prior Art

As is known, in many applications there are used materials comprising a polymer matrix in which are dispersed organic and/or inorganic fillers which impart to the composite material special properties such as color, mechanical resistance, etc.

These composite materials in general are produced by mixing the organic and/or inorganic filler in the form of a powder with the polymer also in form of a powder and usually in the presence of a dispersing medium, for example oil. This type of process requires that the polymer be processable on special machines, and that, moreover, the materials used as fillers possess specific dispersibility characteristics.

In the case of thermoplastic polymers, there are required both high temperatures as well as a high quantity of energy for the mixing of the filler with the polymer in the molten state.

It is also known to produce composite materials by using a process consisting in mixing an aqueous dispersion of the polymer (latex) and the polymer in the form of a powder, and by then coagulating the resultiong dispersion and then separating the coagulated composite material. Even if this process of mixing requires relatively small quantities of energy, the composite material thus obtained does not show a satisfactory homogeneity as required in certain applications.

Moreover, the additin of the organic and/or inorganic filler to the latex may lead to the coagulation of the polymer before a complete homogenization can be achieved.

THE PRESENT INVENTION

An object of the present invention is to provide a process for the preparation of a composite material based on a polymner matrix containing homogeneously dispersed therein an organic and/or inorganic filler, said process not showing the above reported drawbacks.

More particularly, the object of the present invention is to provide a composite material based on a polymer matrix, comprising dispersed therein an organic and/or inorganic filler, showing a high grade of uniformity, prepared by a quite simple process and with the use of only small quantities of energy.

It has now, surprisingly, been found that these, and other objects are achieved only if the following conditions are satisfied:

(a) the polymer matrix and the organic and/or inorganic filler are mixed together in the form of an aqueous dispersion; and (b) the particles of the dispersed system have a high degree of dispersion and show a comparably high stability.

According to the present invention, said conditions are satisfied by using a process for the production of a composite material based on a polymer matrix, comprising homogeneously dispersed therein an organic and/or inorganic filler, said process comprising mixing together the single components in the form of aqueous dispersions in which the particles have a surface charge of the same sign and a "zeta potential" (in absolute value) between 10 mV and 100 mV and the ratio (in absolute value) between the "zeta potential" of the particles of each dispersion is between 0.2 and 5, and then by coagulating the mixed dispersion thus obtained.

"Zeta potentials" (in absolute value) between 15 and 70 mV and ratios (in absolute value) between "Zeta potentials" between 0.5 and 2 are preferred in the process of the present invention.

In the preparation of the composite material, any polymer matrix may be used, provided that it be in the form of a latex or, preferably, obtained by emulsion polymerization.

Examples of polymer that may be used in the process of the present invention are:

fluorinated polymers and elastomers such as polytetrafluoroethylene;

copolymer of vinylidene fluoride and hexafluoropropylene;

terpolymers comprising vinylidene fluoride, hexafluoropropylene and tetrafluoroethylene terpolymers;

terpolymers of vinylidene fluoride, tetrafluoroethylene and perfluoroalkyl-vinyl-ether;

copolymers of tetrafluoroethylene and perfluoroalkyl-vinyl-ether;

copolymers of tetrafluoroethylene and propylene;

copolymers of vinylidene-fluoride and chlorotrifluoroethylene;

copolymers of vinylidenefluoride and hydropentafluoropropylene;

terpolymers of vinylidene fluoride, hydropentafluoropropylene and tetra-fluoroethylene; etc., and the corresponding products comprising in the chain small quantities of trifluoro-bromoethylene chlorinated (co)polymers such as polyvinylchloride and polyvinylidenechloride;

polymers and copolymers such as polyacrylonitrile, polymethacrylates, polymethylmethacrylates, etc.;

polybutadiene; polyisoprene; polycarbonates;

acrylonitrile-butadiene-styrene polymers, known as ABS resins;

vinyl (co)polymers such as polyvinylacetate, ethylene-vinylacetate (EVA) copolymers, polyvinyl-alcohol (PVA), etc., and in general any polymer and copolymer obtained by emulsion polymerization.

Examples of inorganic fillers that may be used in the preparation of the composite materials are: pigments, graphite, bronze in powder form, ground glass in the form of spheres or fibers, molybdenum sulphide, silica, steel powder, metal oxides, carbonates, silicates, etc.

As organic fillers may be cited organic pigments, stabilizers, any polymer or resin different from that which forms the polymer matrix, etc.

According to the present invention, composite materials in which the charge (or filler) is homogeneously dispersed in the matrix, are obtained only if the single components are mixed together starting from preformed dispersions in which the particles are completely wetted by the dispersing medium and which show a surface charge of the same sign and comparable stabilities. By the term "stability" is meant the capacity of the particles to remain in the dispersed state.

The measure of the stability of a dispersed system may be carried out by the "Zeta potential", defined as the electric potential at the particle-solution plane of slippage. The "zeta potential" of particles in a dispersion may be determined by means of an electrokinetic measure such as for instance: electrophoresis, electroosmosis, potential/current flow, etc., as described for example in "Colloid Science", Vol. 1, by H. R. Kruyt, published by Elsevier Publishing Co., in 1952.

The adjusting of the "zeta potential" value of the components of each dispersion may be carried out acting on the mechanisms which control the formation of the surface charge. A suitable method for varying the "zeta potential" is that of varying the pH of the dispersion or otherwise by adding surfactants, polyelectrolytes or ions specifically absorbed, such as for example: sodium laurylsulphate, ammonium perfluorooctanoate, sodium polyacrylate, sodium hexametaphosphate, sodium phosphate, etc.

After the mixing of the dispersions of the single components, the resulting dispersion is coagulated. The coagulation phase is preferably carried out very quickly in order to avoid the selective coagulation of the single components of the dispersion, with consequential dishomogeneity of the coagulate.

Any technique for coagulating the dispersion may be used, such as for instance: vigorous stirring, the addition of electrolytes or the addition of a liquid in which the dispersions are not stable, or a combination of these techniques.

The preferred method in the process of the present invention is the addition of electrolytes such as sulphuric acid, magnesium nitrate, aluminum sulphate, etc., at a concentration at least sufficient to coagulate the dispersion, combined, if necessary, with a vigorous stirring.

The separation of the coagulate from the dispersing medium may be effected by using conventional techniques such as flotation, filtration, centrifugation, decantation, or a combination of these techniques.

The use of the various separation techniques depends on the polymeric matrix used. More particularly, when the polymer phase is polytetrafluoroethylene, a preferred method may be the flotation of the coagulate by using vigorous stirring, while for composite materials based on polyvinylchloride or on tetrafluoroethylene-vinylidene fluoride copolymer, it is advisable to use separation by filtration.

In order to avoid possible negative influences due to the presence of electrolytes in the coagulate, after the separation there may be carried out one or more washings of the coagulate.

The composite materials thus obtained according to the process of this invention are perfectly uniform upon examination under the microscope.

Some of these composite materials are new. One of these new composite materials consists essentially of a fluoroelastomer matrix containing a fluoroplastomer in a dispersed state, said dispersed fluoroplastomer being substantially dispersed in the form of the primary particles, both the fluoroelastomer matrix and the dispersed fluoroplastomer being obtained by emulsion or dispersion polymerization in an aqueous phase. Commonly, at least 90% of the fluoroplastomer particles are present as primary particles. The primary particles of polymers are, as is well known, the polymer particles as they are obtained at the end of the polymerization.

The dispersed fluoroplastomer amounts are commonly from 0.1 to 50% by weight of the composite material, and preferably from 5 to 50% by weight.

Another of these new composite materials consists essentially of a fluoroplastomer matrix containing a fluoroelastomer in a dispersed state, said fluoroelastomer being uniformly distributed inside the coagulated flocks of the fluoroplastomer, both the fluoroplastomer matrix and the dispersed fluoroelastomer being obtained by emulsion or dispersion polymerization in an aqueous phase.

The dispersed fluoroelastomer amounts are commonly from 0.1 to 50% by weight of the composite material, and preferably from 5 to 40% by weight.

The preferred fluoroelastomers, used either as matrix or as dispersed phase, are those already cited hereinbefore, i.e., copolymers of vinylidene fluoride and hexafluoropropylene and, optionally tetrafluoroethylene; terpolymers of vinylidene fluoride, tetrafluoroethylene and a perfluoroalkylvinyl ether; copolymers of vinylidene fluoride and hydropentafluoropropylene and, optionally, tetrafluoroethylene and the corresponding copolymers containing in the chain a small quantity of trifluorobromoethylene.

The most preferred fluoroelastomers are the copolymers of vinylidene fluoride, hexafluoropropylene and, optionally, tetrafluoroethylene, e.g., a copolymer containing from 53 to 80% by moles of vinylidene fluoride, from 19 to 22% of hexafluoropropylene, and from 0 to 25% of tetrafluoroethylene.

The preferred fluoroplastomers, either used as matrix or as dispersed phase, are those already cited hereinbefore, i.e., polytetrafluoroethylene; copolymers of tetrafluoroethylene and a perfluoroalkyl vinyl ether; copolymers of vinylidene fluoride and chlorotrifluoroethylene; and copolymers of tetrafluoroethylene and propylene.

The most preferred fluoroplastomer is polytetrafluoroethylene.

In order still better to understand the present invention the following examples are given. However, they are not to be taken as in any way limitative of the inventive scope of the invention. In the examples, all the percentages and the parts are by weight unless otherwise indicated.

EXAMPLE 1

A dispersion of a red pigment based on iron oxide (Bayer 110M R) was prepared in distilled water, at a concentration of 10 g/l, by means of ultrasonics.

The particles of dispersed pigment showed a "zeta potential" equal to −25 mV.

Thereupon, 20 ml of the dispersion were added under a mild stirring (50 r.p.m.) to a polytetrafluoroethylene latex (PTFE) containing 40 g of polymers.

The thus-obtained dispersion was then diluted with distilled water until a concentration of the PTFE equal to 100 g/l was obtained.

In the latex the PTFE particles showed a "zeta potential" of −30 mV, measured by microelectrophoresis.

To this mixed dispersion thus obtained there was added 10 ml of $H_2SO_4$ (30% by weight) while the stirring speed was rapidly brought up to 700 r.p.m.

The dispersion coagulated completely in a time below 5 minutes The stirring was maintained for another 10 minutes in order to float the coagulate.

The powder, separated from the liquid by filtration on a nylon net, was then dried for 12 hours at 140° C.

A thin ribbon prepared with the pigmented product showed a perfectly uniform color, as well as mechanical and dielectrical properties similar to those of non-pigmented ribbon, and the absence of pigment coagulates under microscopic analysis.

EXAMPLE 2

A pigment based on cadmium sulphoselenide (CP 2400, Ferro Co., USA R) is dispersed, at a concentration of 10 g/l, in an aqueous solution containing 1 g/l of sodium hexametaphosphate, by using a ball mill of the "Red Devil" type.

The pigment particles have a "zeta potential" of -46 mV, measured by electrosmosis.

20 ml of the dispersion were then added, under mild stirring (50 r.p.m.), to a PTFE latex containing 40 g of polymer; the dispersion was thereupon diluted with distilled water to a concentration of 100 g/l.

In the latex the PTFE particles showed a "zeta potential" of −30 mV, measured by electrophoresis.

To the mixed dispersion were then rapidly added under constant stirring 20 ml of a 1 M solution of $Mg(NO_3)_2$ thereby causing bulk coagulation of the particles.

The coagulate was then separated by floating, increasing the stirring velocity to 700 r.p.m. The powder showed a uniform color and was dried at 140° C. for 12 hours.

A ribbon prepared with the pigmented powder showed a uniform color, as well as dielectric and mechanical properties similar to those of a non-pigmented ribbon, and showed absence of coagulated pigment under microscope analysis.

EXAMPLE 3

A sample of graphite (FOLIAC X6236 R) was dispersed at a concentration of 10 g/l, in an aqueous solution containing 1 g/l of sodium polyacrylate, by using a "Red Devil" ball mill. 60 ml of the dispersion were thereupon added to 120 ml of a PTFE latex containing 40 g of polymer.

The "zeta potential" of the graphite particles, measured by electroosmosis, was −15 mV, while the "zeta potential" of the PTFE, measured by electrophoresis, amounted to −30 mV.

The dispersion thus obtained was then diluted, under mild stirring (50 r.p.m.), up to a volukme of 400 ml. Still under mild stirring, there were then added 20 ml of a 1 M solution of $Mg(NO_3)_2$ causing the complete coagulation of the slurry. The thus-coagulated polymer was then floated under stirring of about 700 r.p.m.

The obtained powder, dried at 140° C. for 12 hours, was perfectly uniform under microscopic analysis. A thin ribbon prepared with the dried powder showed a uniform color.

EXAMPLE 4

40 ml of a slurry, obtained by dispersing 25 g of glass fiber in 100 ml of an aqueous solution containing 1 g/l of sodium hexametaphosphate, were added to 120 ml of a PTFE latex containing 40 g of the polymer. The "zeta potential" of the glass fiber, measured by electroosmosis, was −51 mV, while the "zeta potential" of the PTFE, measured by electrophoresis, was −30 mV.

The obtained slurry, diluted to a volume of 400 ml, was then additioned with 20 ml of a 1 M solution of $Mg(NO_3)_2$ under mild stirring (100 r.p.m.). The addition of the electrolyte caused the complete coagulation of the dispersion. The coagulate was thereupon floated, under vigorous stirring (700 r.p.m.), for a period of 15 minutes.

The powder thus obtained, dried for 12 hours at 140° C., under microscopic analysis was shown to be formed of glass fibers individually dispersed in the polymer matrix.

EXAMPLE 5

A PTFE latex was added, in an amount of 10% by weight, to a latex made of a Tecnoflon fluoroelastomer (registered Montedison trademark). This fluoroelastomer contains 80% by moles of vinylidene fluoride and 20% of hexafluoropropylene. The "zeta potential" of the PTFE latex was −30 mV, while the "zeta potential" of the fluoroelastomer was −50 mV, both measured by electrophoresis.

Then 200 ml of the mixed latex were slowly added to an equal volume of an aqueous solution containing 8 g/l of $Al_2(SO_4)_3$, maintained under vigorous stirring (500 rpm). The slurry coagulated instantly.

The coagulate, after separation by filtration and dried for 12 hours at 60° C., appeared under the microscope to be perfectly uniform.

EXAMPLE 6

A PTFE latex, containing 40 g of polymer, was additioned with a dispersion of red pigment CP2400R (by Ferro Co., USA) and a $TiO_2$ dispersion. The total amount of added pigments was equal to 3.5% based on the PTFE.

The "zeta potentials" of the particles are:
for the PTFE= −30 mV
for the red pigment= −46 mV
for the $TiO_2$ pigment= −40 mV.

There were prepared various dispersions, with ratios by weight of red pigment/$TiO_2$ pigment of 10:1, 2.5:1, 1:1, 1:2.5, 1:5, 1:10 and 1:20.

The dispersions were coagulated as described in Example 2. The powders, dried for 12 hours at 140° C., were uniformly colored.

The color of the tablets, obtained by sintering the powders at 400° C., ranges uniformly from red to pink as the red pigment/$TiO_2$ pigment ratio goes down.

EXAMPLE 7

66.7 ml of a polyvinylchloride latex (at a 300 g/l concentration), and 10 ml of dispersion of a yellow F 897 pigment R (Ferro Co., USA) (at a concentration of 10 g/l) were mixed with an aqueous solution containing 0.1 g/l of sodium hexametaphosphate, and 83.4 ml of distilled $H_2O$.

The "zeta potentials" of the particles, measured by electrophoresis, were:
for the polyvinyl chloride: −35 mV,
for pigment: −25 mV.

Thereupon, under a mild stirring, there were admixed 20 ml of a 1 M solution of $Mg(NO_3)_2$, thereby causing the complete coagulation of the slurry.

The colored coagulate was then separated by filtration and dried for 48 hours at 50° C. The resulting powder was uniformly colored.

EXAMPLE 8

3 liters of a latex containing 113 g of polytetrafluoroethylene are added to 2 liters of a latex containing 350 g/l of the same fluoroelastomer as in Example 5.

The zeta potential of the first latex is −40 mV; the zeta potential of the second is −50 mV, both measured by electrophoresis.

The mixed latex is added slowly to an equal volume of an aqueous solution containing 6 g/l of aluminum sulfate, maintained under vigorous stirring. The slurry coagulates instantly.

The coagulate, separated by filtration and dried at 60° C. overnight, contains 33% by weight of polytetrafluoroethylene and 67% of fluoroelastomer.

Examination of the coagulated particles by scanning electron microscopy shows that the PTFE particles are dispersed inside the continuous matrix of fluoroelastomer, essentially in the form of primary particles.

EXAMPLE 9

3.85 liters of a latex containing 113 g/l of polytetrafluoroethylene are added to 1.25 liters of a latex containing 350 g/l of the same fluoroelastomer as in Example 5.

The zeta potential of the first latex is −40 mV; the zeta potential of the second is −50 mV, both measured by electrophoresis.

The mixed latex is added slowly to an equal volume of an aqueous solution containing 6 g/l of aluminum sulfate, maintained under vigorous stirring. The slurry coagulates instantly.

The coagulate, separated by filtration and dried at 60° C. overnight, contains 50% by weight of polytetrafluoroethylene and 50% of fluoroelastomer.

Examination of the coagulated particles by scanning electron microscopy shows that the PTFE particles are dispersed inside the continuous matrix of fluoroelastomer, essentially in the form of primary particles. 95% of the PTFE particles are dispersed as primary particles.

EXAMPLE 10

1.35 liters of a latex containing 113 g/l of polytetrafluoroethylene are added to 3.9 liters of a latex containing 350 g/l of the same fluoroelastomer as in Example 5.

The zeta potential of the first latex is −40 mV; the zeta potential of the second is −50 mV, both measured by electrophoresis.

The mixed latex is added slowly to an equal volume of an aqueous solution containing 6 g/l of aluminum sulfate, maintained under vigorous stirring. The slurry coagulates instantly.

The coagulate, separated by filtration and dried at 60° C. overnight, contains 10% by weight of polytetrafluoroethylene and 90% of fluoroelastomer.

Examination of the coagulated particles by scanning electron microscopy shows that the PTFE particles are dispersed inside the continuous matrix of fluoroelastomer, essentially in the form of primary particles.

What is claimed is:

1. A process for the production of a composite material based on a polymeric matrix comprising homogeneously dispersed therein an organic and/or an inorganic filler, said process comprising mixing together the single components in an aqueous phase, and then coagulating the aqueous composite dispersion thus obtained, characterized in that the single components are in the form of aqueous dispersions in which the particles have a surface charge of the same sign and a "zeta potential" (in absolute value) between 10 and 100 mV, and the ratio (in absolute value) between the "zeta potentials" of the particles of each dispersion is between 0.2 and 5.

2. A process according to claim 1, in which the "zeta potential" (in absolute value) of the particles of each dispersion is between 15 and 70 mV.

3. A process according to claim 1 or claim 2, characterized in that the ratio (in absolute value) between the "zeta potentials" of the particles of each dispersion is between 0.5 and 2.

4. A process according to claim 1 or claim 2, in which the polymeric matrix is in the form of a latex.

5. A process according to claim 4, in which the polymeric matrix is obtained by emulsion polymerization.

6. A process according to claim 1 or claim 2, in which the "zeta potential" of each component is modified either by varying the pH or by the addition of surfactants, polyelectrolytes or specifically absorbed ions.

7. A process according to claim 1 or claim 2, in which the coagulation phase is conducted rapidly.

8. A process according to claim 6, in which the coagulation phase is obtained by the addition of an electrolyte, combined or not with stirring.

9. A process according to claim 1, in which the polymeric material which forms the polymeric matrix is selected from the group consisting of fluorinated polymers, chlorinated polymers, polyacrylonitrile, polymethacrylates, polymethylmethacrylates, polybutadiene, polyisoprene, polycarbonates, acrylonitrile-butadiene-styrene polymers, and polyvinylacetate, (EVA) polymers, and polyvinylacetate, ethylene-vinyl acetate (EVA) copolymers and polyvinyl-alcohol (PVA).

10. A proceses according to claim 9, in which the polymeric material which forms the polymeric matrix is a fluorinated polymer selected from the group consisting of polytetrafluoroethylene; copolymers of vinylidene fluoride and hexafluoropropylene; terpolymers of vinylidene fluoride, hexafluoropropylene and tetrafluoroethylene; terpolymers of vinylidene fluoride, tetrafluoroethylene and a perfluoroalkyl-vinyl-ether; copolymers of tetrafluoroethylene and propylene; copolymers of vinylidene fluoride and chlorotrifluoro-ethylene; copolymers of vinylidene fluoride and hydropentafluoropropylene; terpolymers of vinylidene fluoride, hydropentafluoropropylene and tetrafluoroethylene and the corresponding products comprising in the chain small quantities of trifluorobromo-ethylene.

11. A process according to claim 10, in which the polymeric material which forms the polymeric matrix is polytetrafluoroethylene.

12. A process according to claim 9, in which the inorganic filler is selected from the group consisting of pigments, graphite, bronze in powder form, ground glass in the form of spheres or fibers, molybdenum sulphide, silica, steel powder, metal oxides, carbonates and silicates.

13. A process according to claim 12, in which the inorganic filler is a pigment.

14. A process according to claim 9, in which the organic filler is selected from the group consisting of organic pigments, organic stabilizers, and a polymer or resin different from the polymeric material which forms the polymer matrix.

15. A process according to claim 9, in which the polymeric material which forms the polymeric matrix is polytetrafluoroethylene and the inorganic filler is a pigment.

16. A process for the production of a composite material based on a polymeric matrix comprising homogeneously dispersed therein an inorganic filler, said process comprising mixing together the single components in an aqueous phase and coagulating the aqueous composite dispersion thus obtained, characterized in that the single components are in the form of aqueous dispersions in which the particles have a surface charge of the same sign and a "zeta potential" (in absolute value) between 10 and 100 mV, and the ratio (in absolute value) between the "zeta potentials" of the particles of each dispersion is between 0.2 and 5.

17. A process according to claim 16, in which the "zeta potential" (in absolute value) of the particles of each dispersion is between 15 and 70 mV.

18. A process according to claim 16 or claim 17, characterized in that the ratio (in absolute value) between the "zeta potentials" of the particles of each dispersion is between 0.5 and 2.

19. A process according to claim 16 or claim 17, in which the polymeric material is in the form of a latex.

20. A process according to claim 19, in which the polymeric material is obtained by emulsion polymerization.

21. A process according to claim 16 or claim 17, in which the "zeta potential" of each component is modified either by varying the pH or by the addition of surfactants, polyelectrolytes or specifically absorbed ions.

22. A process according to claim 16 or claim 17, in which the coagulation phase is conducted rapidly.

23. A process according to claim 16 or claim 17, in which the coagulation phase is obtained by the addition of an electrolyte, either with or without stirring.

24. A process according to claim 16, in which the polymeric material is selected from the group consisting of fluorinated polymers, chlorinated polymers or copolymers, polyacrylonitrile, polymethacrylates, polymethylmethacrylates, polybutadiene, polyisoprene, polycarbonates, acrylonitrile-butadiene-styrene polymers, and polyvinylacetate, ethylene-vinyl acetate (EVA) copolymers and polyvinyl-alcohol (PVA).

25. A process according to claim 24, in which the polymeric material which forms the polymeric matrix is a fluorinated polymer selected from the group consisting of polytetrafluoroethylene; copolymers of vinylidene fluoride and hexafluoropropylene; terpolymers of vinylidene fluoride, hexafluoropropylene and tetrafluoroethylene; terpolymers of vinylidene floride, tetrafluoroethylene and perfluoroalkyl-vinyl-ether; copolymers of tetrafluoroethylene and a perfluoroalkyl-vinyl-ether; copolymers of tetrafluoroethylene and propylene; copolymers of vinylidene fluoride and chlorotrifluoro-ethylene; copolymers of vinylidene fluoride, and hydropentafluoropropylene; terpolymers of vinylidene fluoride hydropentafluoropropylene and tetrafluoroethylene and the corresponding products comprising in the chain small quantities of trifluorobromo-ethylene.

26. A process according to claim 25, in which the polymeric material which forms the polymeric matrix is polytetrafluoroethylene.

27. A process according to claim 16, in which the inorganic filler is selected from the group consisting of pigments, graphite, bronze in powder form, ground glass in the form of spheres or fibers, molybdenum sulphide, silica, steel powder, metal oxides, carbonates and silicates.

28. A process according to claim 27, in which the inorganic filler is a pigment.

29. A process according to claim 16, in which the polymeric material which forms the polymeric matrix is polytetrafluoroethylene and the inorganic filler is a pigment.

* * * * *

UNITED STATES PATENT AND TRADEMARK OFFICE
CERTIFICATE OF CORRECTION

PATENT NO. : 4,798,854

DATED : January 17, 1989

INVENTOR(S) : VISCA et al.

It is certified that error appears in the above-identified patent and that said Letters Patent is hereby corrected as shown below:

On the title page, the following was omitted, please insert:

Related U.S. Application Data

--[63] Continuation-In-Part of Ser. No. 848,278, April 4, 1986, abandoned.--

Signed and Sealed this

Seventh Day of May, 1991

Attest:

HARRY F. MANBECK, JR.

*Attesting Officer*  *Commissioner of Patents and Trademarks*